ALKYLENEBISDITHIOCARBAMATE COMPLEX COMPOUNDS

Robert L. Noveroske, Walnut Creek, Calif., assignor to The Dow Chemical Company, Midland, Mich.
No Drawing. Continuation-in-part of abandoned application Ser. No. 39,899, May 22, 1970. This application Apr. 29, 1971, Ser. No. 138,751
Int. Cl. C07f 3/06
U.S. Cl. 260—429.9     8 Claims

ABSTRACT OF THE DISCLOSURE

Novel complexes of ethylenediamine or polyethylenepolyamines with zinc containing alkylenebisdithiocarbamates are prepared by mixing together a water-soluble alkylenebisdithiocarbamate, water-soluble salts of zinc or zinc and one or more additional metal such as, for example, manganese or iron and ethylenediamine and/or one or more polyethylenepolyamines. The complex compounds are stable and can be used to regulate the growth of plants. They are useful as antifungal agents for the control of such fungi as apple scab fungus, rice blast, grape downy mildew and late blight organisms. They also are useful for promoting the growth of higher plants such as grapes, potatoes and the like.

CROSS REFERENCE TO RELATED APPLICATION

This application is a continuation-in-part of application Ser. No. 39,899, filed May 22, 1970, now abandoned.

BACKGROUND OF THE INVENTION

Many known antifungal agents, when applied to the above-ground portions of higher plants, give effective fungus control; however, they also damage blossoms and young fruit with which they come into contact, and thus cannot be used to equal advantage in all instances. In other cases, antifungal agents which give neither rapid nor complete protection from fungi have been used because of their low phytotoxicity. Still other antifungal agents have a low redistribution potential (i.e., poor translocation characteristics through the plant cellular structure) and may thus require several days to diffuse outwardly from the immediate zone or area of contact on the plant so as to protect all surfaces subject to fungal attack. During this redistribution time, the activity of the agent decays in substantial measure, with the result that effective control of the fungus is still not obtained, particularly under conditions of severe fungal attack. Still other antifungal agents have high mammalian toxicity and have thus been hazardous to use in a number of instances.

It is an object of this invention to provide novel complex compounds which are stable, which not only possess high antifungal activty and good translocation properties, but which also have low phytotoxicity levels and low mammalian toxicity. It is a further object of the invention to provide novel complex compounds which possess the above-described properties and which, in addition, possess the property of enhancing the growth of higher plants.

These and other objects and advantages readily will become apparent from the full disclosure of the specification and claims.

SUMMARY OF THE INVENTION

This invention is directed to stable alkylenebisdithiocarbamate:monoethylene- or polyethylenepolyamine complex compounds and to a method and composition employing the same, and is particularly directed to metallic zinc - containing alkylenebisdithiocarbamate:monoethylenediamine or polyethylenepolyamine complex compounds. These are useful as antifungal agents and for promoting the growth of higher plants.

Hereinafter, for convenience both monoethylenediamine and polyethylenepolymaines will be referred to at times as ethylenepolyamine. This term, therefore, is employed to designate compounds of the formula

$$NH_2\text{---}(CH_2CH_2NH)_n\text{---}H$$

wherein $n$ represents an integer from 1 to 5, said formula thus representing ethylenediamine, diethylenetriamine, triethylenetetramine, tetraethylenepentamine and pentaethylenehexamine.

The term "alkylene" is employed in the present specification and claims to designate ethylene or 1,2-propylene; thus, the term "alkylenebisdithiocarbamate" designates one of the ethylenebisdithiocarbamate and 1,2-propylenebisdithiocarbamate.

The term "polymetallic zinc-containing alkylenebisdithiocarbamate" is employed in the present specification and claims to designate the polymeric alkylenebisdithiocarbamate ion with an equivalent amount of two or more water-soluble metal salts, one of which is a zinc salt. In such compounds, the metals are chemically combined in amounts corresponding to their starting molar ratios. The zinc and additional metal ions are at least divalent such as manganous, ferrous, cupric, nickelous, ferric and cobaltous ions, and since the alkylenebisdithiocarbamate ion is divalent, the several ions are combined to form a polymeric product.

Polymetallic zinc-containing alkylenebisdithiocarbamates can also be described as "coreacted zinc metal alkylenebisdithiocarbamates" in accordance with the nomenclature of Nemec et al., U.S. Pat. No. 3,210,394.

The invention includes and is exemplified by compounds wherein the metal is present at any intermediate value between about 30 and 100 mole percent of zinc and from about 70 to zero (0) mole percent of total quantity of additional metal which can be one or more of manganese, nickel, iron, cobalt or copper.

The maximum operable molar ratio of zinc to the ethylenepolyamine in the complex compound of the present invention is 8:1. The preferred operable molar ratios of zinc to the ethylenepolyamine is from 6:1 to 3:1. The minimum lower operable molar ratio of zinc to ethylenepolyamine complex compound necessary to obtain the desired results with the present compounds varies depending upon the specific ethylenepolyamine employed as defined directly hereinafter. When the ethylenepolyamine corresponds to the formula such that the integer $n$ is from 3 to 5; i.e. it is one of triethylenetetramine, tetraethylenepentamine or pentaethylenehexamine, the minimum zinc to ethylenepolyamine molar ratio is 0.5 to 1; when the ethylenepolyamine is diethylenetetramine, i.e. the integer $n$ is 2, the minimum zinc to diethylenetriamine molar ratio is about 2:1; and when the ethylenepolyamine is ethylenediamine i.e. the integer $n$ is 1, the minimum zinc to ethylenediamine molar ratio is about 2.5:1.

It is to be understood that within these disclosed maximum and minimum ratios of zinc to ethylenepolyamine for the various ethylenepolyamine moieties any intermediate molar ratios are operable.

Representative intermediate molar ratios of zinc to additional metal (zinc:additional metal) include, for example 31:69, 52.5:47.5, 66.33:33.67, 72.43:27.57 and 99.5:0.5. Representative intermediate molar ratios of zinc to ethylenepolyamine (zinc:ethylenepolyamine) include such ratios as 1.33:1, 0.7:1, 2.5:1, 0.93:1 and the like.

For the sake of convenience, the compounds defined above will be referred to herein simply as "complex compounds." Individual complex compounds will be named as zinc metal ethylenebisdithiocarbamate:ethylenepolyamine or zinc metal 1,2-propylenebisdithiocarbamate:ethylenepolyamines, with the molar percentage of zinc and the additional metal being given in parentheses immediately following the names of the metals in the case of the polymetallic complexes, and the molar ratio of zinc only to ethylenepolyamine being expressed in parentheses at the end of the name. In general, the additional metals employed in the complex compounds are employed in a divalent form, with the exception of iron. When the valence of an additional metal is greater than two, the valence will be indicated by a Roman numeral following the name of such metal, while the absence of a Roman numeral will indicate that the metal is divalent in the complex compound, e.g., "iron" is ferrous iron, "iron III" is ferric iron and "copper" is cupric copper. When an additional metal is present in a hydrated form, as manganese dihydrate, the water of hydration will be expressed by a term such as "dihydrate." In complex compounds wherein zinc is the sole metal, i.e., the ratio of zinc:additional metal is 100:0, the molar ratio of zinc to additional metal will not be expressed.

The ethylenepolyamine can be from 1 to 5 of the five different ethylenepolyamines represented by the hereinabove set forth formula. In general, it is preferred that the ethylenepolyamine compound be a single specific ethylenepolyamine. In those cases in which the complex compound includes more than one type of ethylenepolyamine moiety, each such moiety will be expressed separately, with the molar ratio of each named ethylenepolyamine to zinc being stated parenthetically immediately following the name of the ethylenepolyamine, e.g., zinc ethylenebisdithiocarbamate·triethylenetetramine(3:1) · tetraethylenepentamine(3:1).

Representative complex compounds of the invention, named as described above, include zinc ethylenebisdithiocarbamate·triethylenetetramine-(2:1);
zinc ethylenebisdithiocarbamate·triethylenetetramine-(8:1);
zinc(90)iron III(5)manganese dihydrate(5)ethylenebisdithiocarbamate·triethylenetetramine(3:1);
zinc(70)iron(5)manganese(20)cobalt(5)ethylenebisdithiocarbamate·tetraethylenepentamine(1:1);
zinc(95)manganese(3)iron(2)ethylenebisdithiocarbamate·pentaethylenehexamine(1:1);
zinc(95)copper(5)ethylenebisdithiocarbamate·triethylenetetramine(2:1);
zinc ethylenebisdithiocarbamate·tetraethylenepentamine-(4:1);
zinc ethylenebisdithiocarbamate·pentaethylenehexamine-(3:1);
zinc 1,2-propylenebisdithiocarbamate·triethylenetetramine (1.4:1);
zinc 1,2-propylenebisdithiocarbamate·tetraethylenepentamine(3:1);
zinc 1,2-propylenebisdithiocarbamate·pentaethylenehexamine(4:1);
zinc(37.5)manganese(62.5)1,2-propylenebisdithiocarbamate·triethylenetetramine(1:1);
zinc(95)manganese(1)iron(1)copper(1)cobalt(1)nickel-(1)ethylenebisdithiocarbamate·triethylenetetramine-(2.6:1);
zinc(70)manganese(30)1,2-propylenebisdithiocarbamate·triethylenetetramine(2:1)·tetraethylenepentamine-(2:1);
zinc(50)manganese(50)1,2-propylenebisdithiocarbamate·triethylenetetramine(1:1);
zinc(90)manganese dihydrate(5)iron III(5)ethylenebisdithiocarbamate·triethylenetetramine(3:1);
zinc ethylenebisdithiocarbamate·triethylenetetramine-(1:1);
zinc ethylenebisdithiocarbamate·triethylenetetramine-(0.5:1);
zinc ethylenebisdithiocarbamate·tetraethylenepentamine-(3:1);
zinc ethylenebisdithiocarbamate·tetraethylenepentamine-(0.5:1);
zinc(95)manganese(5)ethylenebisdithiocarbamate·triethylenetetramine(2:1);
zinc(70)manganese(30)ethylenebisdithiocarbamate·triethylenetetramine(1.4:1);
zinc(30)manganese(70)ethylenebisdithiocarbamate·triethylenetetramine(3:1);
zinc(50)manganese(50)ethylenebisdithiocarbamate·triethylenetetramine(3:1);
zinc(90)manganese(5)iron III(3)copper(2)ethylenebisdithiocarbamate·tetraethylenepentamine(3:1);
zinc ethylenebisdithiocarbamate·triethylenetetramine-(4:1);
zinc ethylenebisdithiocarbamate·triethylenetetramine-(6:1);
zinc ethylenebisdithiocarbamate·ethylenediamine(2.5:1);
zinc ethylenebisdithiocarbamate·diethylenetriamine (2:1);
zinc ethylenebisdithiocarbamate·diethylenetriamine-(2.5:1);
zinc ethylenebisdithiocarbamate·diethylenetriamine-(3:1); and
zinc(95)copper(5)1,2-propylenebisdithiocarbamate·ethylenediamine(2.5:1).

The novel compounds of the present invention are generally amorphous or crystalline solid materials, most of which are white but which may also have other colors, particularly when the compound is a polymetallic complex compound. The complex compounds are very slightly soluble in water and organic solvents. The complex compounds form moderately stable dispersions in aqueous solutions of the polyamines.

The complex compounds of the present invention do not evidence characteristic melting or liquefaction points upon heating but rather visibly decompose.

The complex compounds of the invention have been found to be useful for altering the growth of plants. The compounds have been found to inhibit the growth of lower plants such as fungi, while exhibiting no significant phytotoxicity to higher plants. The compounds have also been found to enhance the growth of higher plants. The present complex compounds are particularly useful for the control of a wide range of fungi, especially those fungal organisms ordinarily found on the aerial portions or on the seeds of higher plants such as, for example, cherry leaf spot, apple scab, rice blast, downy mildews, damping-off of cottonseed, Helminthosporium leaf spot on grasses, cereals and corn, cereal rusts, Pythium on corn or pea seeds, Cercospora and Septoria leaf spots and late blight. For control of such organisms, a plant or plant part or plant growth media is contacted with a plant growth-altering amount of one or more complex compounds of the invention.

The complex compounds of the present invention can be applied to growing vegetation or to seeds of higher plants in amounts required for effective fungal control without significant injury to the plants. Also, the complex compounds are useful both in eliminating established fungal infestation as well as in providing residual and extended control against fungal attack. Further, the complex compounds exhibit high redistribution potentials, that is, they are readily distributed or translocated through the cellular structure or plant contacted therewith and can thus effect rapid coverage and protection of plant parts when applied thereto. Also, application of the present complex compounds to higher plants in plant growth-altering amounts can be beneficially used to stimulate plant growth on such crop plants as grapes, potatoes and celery, for example, even in the absence of significant fungal disease pressure. It is a yet further advantage that the complex compounds have low mammalian toxicity and can thus be handled with a minimum of danger from accidental mammalian exposure thereto.

For such uses, ordinarily the complex compounds employed are those wherein the additional metal, when present, is trivalent iron or divalent manganese, copper, cobalt or nickel. A preferred group of complex compounds includes those wherein the mole ratio of zinc to additional metal is from 60:40 to 100:0 and wherein the additional metal, when present, is divalent manganese, copper, cobalt or nickel, ferric iron or mixtures of these. Representative compounds include those complex compounds wherein the mole ratio of the zinc to the additional metal, when present, is from 60:40 to 100:0, and the additional metal is selected from manganese and iron or mixtures thereof, the ethylenepolyamine is pentaethylenehexamine and the molar ratio of zinc to ethylenepolyamine is from 1:1 to 4:1. Another preferred group of compounds includes those wherein the ethylenepolyamine is triethylenetetramine. A most preferred group of compounds includes those wherein the mole ratio of zinc to the additional metal, when present, is from about 90:10 to 100:0, wherein the additional metal is manganese or iron or both, i.e. a mixture thereof, wherein the ethylenepolyamine is ethylenediamine, diethylenetriamine or triethylenetetramine and wherein the mole ratio of zinc to ethylenepolyamine is from about 3:1 to 6:1.

The complex compounds of the invention can be prepared by the reaction of a water-soluble alkali metal or ammonium alkylenebisdithiocarbamate, water-soluble salts of zinc or mixtures of water-soluble salts of zinc and additional metals and an ethylenepolyamine corresponding to the hereinabove set forth formula. Representative water-soluble alkylenebisdithiocarbamate starting materials include ethylenebisdithiocarbamate or 1,2-propylenebisdithiocarbamate salts of lithium, sodium, potassium or ammonium, for example. Representative water-soluble salts of zinc or of manganese, iron, copper, nickel or cobalt include the chloride, sulfate, nitrate or acetate salts, for example. The ethylenepolyamine reactant is preferably added as the free base, though salts thereof such as the sulfates, phosphates, nitrates, hydrohalides, acetates, citrates and the like can also be employed. When a salt is employed, the acidity of the reaction mixture is adjusted by the addition of a base such as sodium hydroxide, for example, to liberate the free base ethylenepolyamine.

The complex compounds are formed when the reactants are contacted and mixed in an inert solvent. Representative inert solvents which can be employed as reaction media include water, methanol, ethanol, isopropanol and mixtures thereof, aqueous media being preferred. The reaction proceeds at temperatures between about 10° and 50° C. in an aqueous or alcoholic medium and is generally complete in from about 2 to 60 minutes. The zinc-containing alkylenebisdithiocarbamate·ethylenepolyamine complex compound product precipitates in the reaction mixture when the liquid employed is one in which said product is insoluble. In this connection it may be noted that water is the preferred solvent when preparing complexes with ethylenediamine, diethylenetriamine and triethylenetetramine in all molar ratios of zinc to the amine component, as well as when preparing complexes with tetraethylenepentamine or pentaethylenehexamine at relatively high zinc/amine ratios such as from about 2 to 8 moles of zinc per mole of the ethylenepolyamine component. On the other hand, the complex compound products prepared with tetraethylenepentamine or pentaethylenehaxamine which contain relatively large proportions of said compounds such, for example, as from about 0.5 to 1.5 or even 2 moles of zinc per mole of the amino compound, tend to have an appreciable solubility in water. Accordngly, the latter complex compound products are preferably prepared using a non-aqueous solvent, and methanol has been found to give particularly good results. The precipitated product can be isolated by filtration, decantation, centrifugation or other conventional methods and the product can be purified by conventional procedures such as washing with water, methanol, aqueous methanol or the like to remove any unreacted starting materials which may be present. The complex compound product can be employed to control fungi and enhance plant growth directly with or without purification, or it can be purified by washing and dried under ambient or reduced pressures at temperatures which are well below the decomposition point of the particular product. Temperatures of from about 35° to 75° C. are advantageously employed in drying the product.

The reactants combine to form a zinc-containing alkylenebisdithiocarbamate complex compound when mixed together in any proportions; however, the identity of the product produced in a given instance is dependent upon the molar proportions of certain of the reactants employed.

Thus, in the preparation of the polymetallic complex compounds of the invention, it is critical and essential that the water-soluble salts of the zinc and the additional metal or metals be employed in substantially the same molar proportions (based on the metal content of each salt) as are desired to be obtained in the final product. The water-soluble zinc or mixture of zinc and additional metal salt reactants are thus employed in such proportions as to provide zinc ions in the reaction mixture in the amount of from about 30 to 100 mole percent of the metal ions provided by such reactant. When substantially less than 30 mole percent of the metal ions are provided by the zinc salt, such as 10 or 20 mole percent, the product obtained will contain a corresponding ratio of zinc to the additional metal and will not possess many of the desirable plant growth-altering properties of the complex compounds of the invention. The relative proportions of water-soluble alkylenebisdithiocarbamate and water-soluble zinc or additional metal salts are not critical and any unreacted excess of either reactant can be separated from the complex compound product by conventional procedures such as filtration and washing. In a preferred procedure, the water-soluble salts of zinc or the additional metals and the water-soluble alkylenebisdithiocarbamate are employed in stoichiometric proportions. Thus, it is preferred to employ sufficient alkylenebisdithiocarbamate to react with the zinc and metal reactants without employing a significant excess of alkylenebisdithiocarbamate.

The minimum amount of ethylenepolyamine reactant to be employed is likewise critical to the preparation of the complex compounds and a sufficient amount of the amine must be employed to provide at least one-eighth molar proportion of ethylenepolyamine for every molar proportion of zinc in the desired product. When substantially less ethylenepolyamine is employed, such as 0.1 or 0.05 molar proportion thereof per molar proportion of zinc, products are obtained which lack many desirable plant growth-altering properties, such as high antifungal potency. When using one or more additional metal salt reactants along with zinc, the molar content of the zinc alone is taken into account when calculating the amount of ethylenepolyamine to be employed. In such a case, the latter reactant is employed in an amount of at least one-eighth the molar proportion of zinc salt reactant employed. When the amine reactant is a mixture of two or even three ethylenepolyamines, the total molar quantity of said amine reactants must be at least one-eighth the molar quantity of zinc to be present in the deisred product. It is generally preferred to employ all the reactants in stoichiometric amounts, in which case from one-eighth to 2 molar proportions of ethylenepolyamine reactant are employed for every molar proportion of zinc salt reactant. In most cases, the exact proportions of zinc salt reactant and ethylenepolyamine to be employed correspond to the molar ratio of zinc and ethylenepolyamine desired in the final product. However, in many instances, when employing triethylenetetramine, tetraethylenepentamine and pentaethylenehexamine or mixtures thereof as the ethylenepolyamine reactant, it is necessary to employ an excess of this reactant to obtain a product having a particular molar ratio of zinc to ethylenepolyamine.

In preparations wherein the ethylenepolyamine reactant is employed in excess, the use of an organic solvent rather than water is recommended, at least in those cases where a metal is being employed which is capable of being oxidized to a higher valency state which is not desired. In this connection, and under given reaction conditions of temperature, solvent, mole concentrations of reactants and the like, a greater or lesser excess of ethylenepolyamine may be required to produce a complex compound having a particular molar ratio of zinc to said amine. In any such case, elemental analysis of the solid complex compound will readily provide information as to the molar ratio of zinc to ethylenepolyamine in the product obtained. When the product is found by elemental analysis to contain a higher or lower ratio of zinc to the ethylenepolyamine compound than desired, the excess of said amine reactant employed can be increased or decreased, respectively, to produce a product having the desired ratio.

In a convenient procedure for the preparation of the complex compounds of the invention, a water-soluble alkylenebisdithiocarbamate, a water-soluble zinc salt, an ethylenepolyamine corresponding to the hereinabove set forth formula and, optionally, one or more additional metal salts are mixed together with an inert solvent, preferably water, in any order or fashion. In a preferred procedure, the water-soluble alkylenebisdithiocarbamate is first dissolved in the inert solvent and the ethylenepolyamine reactant, water-soluble zinc salt and additional water-soluble metal salts are added to the solution in the required proportions. The amount of inert solvent employed is preferably such as to provide from about 5 to about 25 percent by weight of solids in the ultimate reaction mixture. In such procedure, the ethylenepolyamine reactant, the water-soluble zinc salt and any additional metal salt employed can be mixed together in the required proportions with additional inert solvent and added as a solution, or they can be added individually to the alkylenebisdithiocarbamate solution. When it is desired to mix the ethylenepolyamine with the additional metal salt, for example a manganese salt, prior to adding the mixture to the alkylenebisdithiocarbamate solution, it is preferred that the admixture of these components be carried out in methanol. The reaction mixture is then mechanically mixed and held at a temperature range until precipitation of the complex compound is complete. The product is conveniently separated from the reaction mixture by filtration. The complex compound is obtained as a filter cake which can be employed directly to alter the growth of plants, including fungal plants. Alternatively, the product can be washed with water or methanol and dried by conventional procedures. When a complex compound containing manganese is not dried, or is dried at temperatures less than about 40° C., the complex compound product generally contains the manganese in the form of the dihydrate. Drying the product at temperatures of 70° C. or higher removes the water of hydration. Complex compounds containing either the hydrated or dehydrated manganese are both useful for influencing the growth of plants, and since the hydrated manganese complex compounds require no particular isolation or drying steps for their preparation, they are generally more conveniently employed in plant growth-influencing operations.

In an alternate method of preparation, the complex compounds can be prepared by the reaction of one or more ethylenepolyamine corresponding to the hereinabove set forth formula, with a zinc alkylenebisdithiocarbamate or with a polymetallic zinc-containing alkylenebisdithiocarbamate. These salts can be employed either per se, or in the form of a wettable powder composition containing surfactants or the like in which the salts are present. The formation of the complex compound proceeds when the reactants are mixed together in an inert aqueous or alcoholic liquid reaction medium. The reaction proceeds at temperatures from about 10° to about 50° C. and is generally complete in from about 30 to about 120 minutes. The complex compound product can be employed directly to influence the growth of plants by the application of the diluted or undiluted reaction mixture to plants or plant parts. Alternatively, the product can be separated and purified by conventional procedures such as filtration and washing.

As set forth hereinbefore, the proportions of the reactants to be employed generally correspond to the molar ratio of zinc to ethylenepolyamine to be obtained in the product. Consequently, it is essential that at least one-eighth molar proportion of ethylenepolyamine be employed for each molar proportion of zinc in the zinc-containing alkylenebisdithiocarbamate starting material. The use of substantially less ethylenepolyamine reactant, such as one-sixteenth or one thirty-second mole per mole of zinc, results in a loss of desirable plant growth-alternating properties such as antifungal potency and lack of phytotoxicity.

In many cases if the complex compound is to contain a precise amount of the amine reactant such as, for example, ¼, ½ or ¾ mole of ethylenepolyamine per mole of zinc, then the amine and zinc-containing reactants can be employed in corresponding proportions. In such operations, the mixture is well stirred and is held for a period of time sufficient for the reaction to go to completion.

In other cases, as disclosed hereinbefore, however, it may be necessary to use an excess of the amine reactant in order to obtain a complex compound having the desired component ratio. Thus, for example, when it is desired to prepare a complex compound which contains more than about one mole of the ethylenepolyamine per mole of zinc, or when the composition is to be employed immediately after the reaction is complete to control fungi or promote the growth of higher plants, the preferred practice is to add excess ethylenepolyamine in amounts of from about 2 to 10 moles thereof per mole of zinc, the relatively larger excesses acting in many cases to dissolve or disperse the zinc-containing alkylenebisdithiocarbamate in the reaction medium. The complex compound which thereafter forms in the mixture or is precipitated therefrom will contain from 1 to 2 moles of ethylenepolyamine per mole of zinc in most cases. Elemental analysis of the purified product can be employed to determine the molar ratio of zinc to ethylenepolyamine obtained in any particular case. The excess of the amine reactant to be employed under particular reaction conditions can be increased or decreased depending upon whether the zinc:ethylenepolyamine molar ratio in the product is higher or lower than the exact ratio desired.

DESCRIPTION OF THE PREFERRED EMBODIMENTS

The following examples are illustrative of the invention but are not to be construed as limiting.

In the remainder of the present specification, the following convention will be employed to express elemental analysis data and amounts. The terms "grams" and "milliliters" will be expressed as g. and ml. respectively. The elements assayed will be listed, each element being named by a conventional abbreviation, carbon as C, hydrogen as H, nitrogen as N and sulfur as S, followed by the percentage of each named element found and lastly, by the percentage calculated to be present in the named product. In each list of found or calculated percentage values, the order in which the values are set out corresponds to the order in which the elements were named.

Example 1

To 24.7 g. (0.068 mole) of disodium ethylenebisdithiocarbamate hexahydrate (hereinafter referred to as nabam), dissolved in 750 ml. of water, there was added 9.93 g. (0.068 mole) of triethylenetetramine. To this solution 9.27 g. (0.068 mole) of zinc chloride was slowly added as the solution was stirred. There was formed a white precipitate which was filtered off after continuing stirring for several minutes. This precipitate was washed several times first with water and then with methanol, following which it was dried for 16 hours at 40° C. There was obtained a white powder, insoluble in water and organic solvents, which decomposed when heated at temperatures above about 150° C. Elemental analysis was consistent with a zinc ethylenebisdithiocarbamate-triethylenetetramine(1:1) product, said analysis showed the complex compound to have carbon, hydrogen, nitrogen and sulfur contents of 28.06, 5.52, 19.97 and 29.62 percent, respectively, as compared to theoretical values of 28.46, 5.73, 19.92 and 30.39 percent, respectively, for the named structure.

Example 2

To a solution of 0.02 mole nabam (7.28 g.) in 50 ml. methanol was added 0.1 mole (14.6 g.) of triethylenetetramine. A solution of 0.02 mole (2.72 g.) of zinc chloride in 3 ml. water was added to the methanol solution as the latter was stirred. Stirring of the solution was continued for one half hour, following which the solid product was filtered off and washed with methanol. On drying the product at 40° C. there was recovered a light yellow solid, substantially insoluble in water or organic solvents, which decomposed at about 139° C. Elemental analysis of the product was consistent with the structure zinc ethylenebisdithiocarbamate·triethylenetetramine-(2:3). C, H, N, S; found (percent): 31.5, 6.9, 22.8, 26.2; calculated (percent): 31.5, 6.7, 22.7, 25.89.

Example 3

In this operation 0.005 mole (0.73 g.) of triethylenetetramine was dissolved in a solution of 0.02 mole (7.28 g.) nabam in 50 ml. water, and to this solution was slowly added 0.02 mole (2.72 g.) zinc chloride dissolved in 10 ml. water. The solution was stirred as the zinc chloride was added and for a period of 30 minutes thereafter. The white solid precipitate which formed was filtered off, washed three times with water and dried at 40° C. The resulting material, having a decomposition point of approximately 166° C. and being insoluble in water and in organic solvents was shown by elemental analysis to have a composition consistent with the structure zinc ethylenebisdithiocarbamate·triethylenetetramine (4:1). C, H, N, S; found (percent): 21,15, 3.37, 13.46, 41.03; calculated (percent): 21.1, 3.2, 13.3, 38.46.

Example 4

To a solution of 0.02 mole (7.28 g.) of nabam in 75 ml. methanol was added 0.02 mole (3.78 g.) of tertaethylenepentamine. Thereafter, 0.02 mole (2.72 g.) of zinc chloride in 25 ml. methanol was first filtered and then slowly added, with stirring, to the other solution. Stirring was continued for a period of one-half hour, following which a cream colored precipitate was filtered off, washed with methanol and dried at 40° C. There was recovered a product which decomposed at 150° C. and was of low solubility in water and organic solvents. The elemental analysis disclosed the solid to have a composition consistent with the structure zinc ehtylenebisdithiocarbamate·tetraethylenepentamine(1:1). C, H, N, S; found (percent): 29.8, 6.0, 20.9, 28.3; calculated (percent): 31.0, 6.25, 21.1, 27.56.

Example 5

Following the procedure of Example 4, but using an equivalent amount of pentaethylenehexamine rather than tetraethylenepentamine, there was recovered a cream colored solid, decomposing at 167° C. and insoluble in water and organic solvents, having a composition consistent with the structure zinc ethylenebisdithiocarbamate·pentaethylenehexamine(2:1). C, H, N, S; found (percent): 29.0, 5.0, 17.7, 31.8; calculated (percent): 29.59, 5.11, 17.89, 32.71.

Example 6

In this operation 0.02 mole (3.78 g.) of tetraethylenepentamine was added to a solution of 0.02 mole (7.28 g.) nabam in 50 ml. water. A solution of 0.02 mole (2.72 g.) of zinc chloride in 10 ml. water was slowly added to the first prepared solution, with stirring. After a further period of stirring the white precipitate present in the reaction mixture was filtered off, washed with water and dried at 40° C. There was obtained a white powdery product which decomposed at about 158° C. and was substantially insoluble in water and organic solvents. Elemental analysis disclosed it to have a structure consistent with zinc ethylenebisdithiocarbamate·tetraethylenepentamine(5:1). C, H, N; found (percent): 21.1, 3.8, 13.4; calculated (percent): 21.45, 3.4, 13.4.

Example 7

The procedure of Example 6 was repeated, but with an equivalent amount of pentaethylenehexamine being substituted for the tetraethylenepentamine reactant. There was obtained a cream-yellow product decomposing at about 164° C. insoluble in water and organic solvents and having elemental analysis consistent with the product zinc ethylenebisdithiocarbamate:pentaethylenehexamine (3:1). C, H, N, S; found (percent): 24.8, 5.0, 15.1, 33.82; calculated (percent): 24.92, 4.35, 15.89, 36.31.

Example 8

In this operation, 0.055 mole (7.5 g.) of zinc chloride and 0.003 mole (0.37 g.) of manganese chloride were dissolved in 60 ml. water and the resulting solution slowly added, with stirring, to a solution containing 0.058 mole (21 g.) of nabam and 0.064 mole (9.3 g.) of triethylenetetramine in 300 ml. of water at 50° to 60° C. An off-white precipitate formed which, after a further stirring period of approximately one hour, was filtered off and washed first with water and then with methanol before being dried at 40° C. The resulting product, which is substantially insoluble in water and organic solvents, was disclosed by elemental analysis to have a structure consistent with the composition zinc(95)manganese dihydrate(5)ethylenebisdithiocarbamate:triethylenetetramine(1.23:1). C, H, N; found (percent): 26.6, 5.1, 18.1.

Example 9

A solution of 0.014 mole (1.9 g.) of zinc chloride and 0.006 mole (1.19 g.) of manganese chloride tetrahydrate in 10 ml. of water was slowly added over the course of approximately 5 minutes to a solution of 0.02 mole (7.28 g.) of nabam and 0.014 mole (2.04 g.) of triethylenetetramine in 75 ml. of water. Following the combining of the two solutions, the mixture was stirred for an additional half hour and then filtered to recover a precipitate which was washed with water and dried at 40° C. There was obtained a cream-yellow solid which decomposed at 160° C. and had little, if any, solubility in water or organic solvents. Elemental analysis of the material is consistent with the composition zinc(70) manganese dihydrate (30)ethylenebisdithiocarbamate·triethylenetetramine(1.33:1). C, H, N; found (percent): 24.04, 4.0, 13.9.

Example 10

Following the procedure of Example 9, 0.02 mole nabam, 0.006 mole triethylenetetramine, 0.006 mole zinc chloride and 0.014 mole manganese chloride tetrahydrate were reacted. A tan solid was recovered which decomposed at about 206° C. and was substantially insoluble in water and organic solvents. Elemental analysis of the composition is consistent with the composition zinc(30) manganese dihydrate(70)ethylenebisdithiocarbamate·triethylenetetramine(1.25:1). C, H, N; found (percent): 21.42, 3.6, 12.56.

Example 11

Following the procedure of Example 9, 0.02 mole nabam, 0.019 mole triethylenetetramine, 0.019 zinc chloride and 0.001 mole of ferrous chloride tetrahydrate were reacted. A gray solid was recovered with decomposed at 148° C. and was insluble in water and organic solvents. Elemental analysis is generally consistent with the composition zinc(95)iron(5)ethylenebisdithiocarbamate·triethylenetetramine(1.36:1) C, H, N; found (percent): 26.6, 5.04, 17.6.

Example 12

Following the procedure of Example 9, there was reacted 0.02 mole nabam, 0.012 mole triethylenetetramine, 0.012 mole zinc chloride and 0.008 mole cupric chloride dihydrate. In this operation, an aqueous solution of the zinc and copper salts were treated with concentrated hydrochloric acid in an amount sufficient to clear the solution before the latter was added to the solution of nabam and triethylenetetramine. There was obtained a reddish brown solid which decomposed at 154° C. and was highly insoluble in water and organic solvents. Elemental analysis of the material was consistent with the composition zinc(60)copper(40)ethylenebisdithiocarbamate·triethylenetetramine(1.2:1). C, H, N, S; found (percent): 24.06, 4.47, 15.2, 34.74.

Example 13

The procedure of Example 9 was repeated to react 0.02 mole nabam, 0.018 mole triethylenetetramine, 0.018 mole zinc chloride, 0.001 mole ferric chloride hexahydrate and 0.001 mole of manganese chloride tetrahydrate. The resulting tan product decomposed at about 143° C. This product was insoluble in water and organic solvents. Elemental analysis of the compound was consistent with the composition zinc(90)iron III(5)manganese dihydrate(5) ethylenebisdithiocarbamate·triethylenetetramine(1.33:1). C, H, N, S; found (percent): 25.39, 4.7, 14.8, 30.6.

Example 14

Following the procedure of Example 9 there was reacted 0.02 mole nabam, 0.018 mole triethylenetetramine, 0.018 mole zinc chloride, and 0.002 mole cobalt chloride hexahydrate. There was obtained an olive colored solid decomposing at 155° C. which was insoluble in water and organic solvents. Elemental analysis of the product is consistent with the composition zinc(90)cobalt(10)ethylenebisdithiocarbamate·triethylenetetramine(1.66:1). C, H, N, S; found (percent): 25.13, 4.28, 16.44, 32.04.

Example 15

Following the procedure of Example 9, 0.02 mole nabam, 0.016 mole triethylenetetramine, 0.016 mole zinc chloride and 0.004 mole nickel chloride hexahydrate were reacted. The resulting light green solid product decomposed at 155° C. and was insoluble in water and organic solvents. Elemental analysis of the product was consistent with the composition zinc(80)nickel(20)ethylenebisdithiocarbamate·triethylenetetramine(1:1).

Example 16

Following the procedure of Example 9 there was reacted 0.025 mole (7.5 g.) of the disodium salt of 1,2-propylenebisdithiocarbamic acid, 0.030 mole of triethylenetetramine and 0.025 mole of zinc chloride to obtain a white solid decomposing at 135° C. which was insoluble in water and organic solvents. Elemental analysis of the material was consistent with the composition zinc 1,2-propylenebisdithiocarbamate:triethylenetetramine(1.33:1). C, H, N; found (percent): 28.5, 5.3, 17.5.

Example 17

Following the method of Example 3, 0.01 mole (1.46 g.) of triethylenetetramine was reacted with 0.08 mole (29.12 g.) of nabam in 150 ml. water and then with 0.08 mole (10.88 g.) of zinc chloride. Following washing and drying of the precipitate there was obtained a white amorphous solid, decomposing at about 190° C. which was insoluble in water and organic solvents. Elemental analysis disclosed it to have a composition consistent with the structure zinc ethylenebisdithiocarbamate:triethylenetetramine(8:1).

Example 18

To an agitated solution of 0.02 mole (5.5 g.) of 93% nabam dissolved in 100 ml. of distilled water was added 0.005 mole (0.3 g.) of ethylenediamine. To this agitated solution was added dropwise 10 ml. of an aqueous solution containing 0.019 mole (5.46 g.) of zinc sulfate heptahydrate and 0.001 mole (0.17 g.) of manganese sulfate dihydrate. Agitation of the solution was continued for one-half hour, following which the solid product which precipitated out was filtered off, washed with water and dried at 40° C. The zinc(95)manganese dihydrate(5)ethylenebisdithiocarbamate:ethylenediamine(4.2:1) product which was recovered was a light purple solid, substantially insoluble in water or organic solvents. The product decomposed at 153° C. Elemental analysis of the product was consistent with the assigned structure. C, H, N; found (percent): 18.6, 2.8, 12.1; calculated (percent): 18.52, 2.8, 12.0.

Example 19

To an agitated solution of 0.02 mole (5.5 g.) of 93% nabam dissolved in 100 ml. of distilled water was added 0.0033 mole (0.198 g.) of ethylenediamine. To this agitated solution was added dropwise 10 ml. of an aqueous solution containing 0.019 mole (5.46 g.) of zinc sulfate heptahydrate and 0.001 mole (0.17 g.) of manganese sulfate dihydrate. Agitation of the solution was continued for one-half hour, following which the solid product which precipitated out was filtered off, washed with water and dried at 40° C. The zinc(95)manganese dihydrate(5) ethylenebisdithiocarbamate:ethylenediamine(6.3:1) product which was recovered was an off-white solid, substantially insoluble in water or organic solvents. The product decomposed at 155° C. Elemental analysis of the product was consistent with the assigned structure. C, H, N; found (percent): 17.9, 2.8, 11.4; calculated (percent): 18.14, 2.63, 11.4.

Example 20

To an agitated solution of 0.02 mole (5.5 g.) of 93% nabam dissolved in 100 ml. of distilled water was added 0.005 mole (0.52 g.) of diethylenetriamine. To this agitated solution was added dropwise 10 ml. of an aqueous solution containing 0.019 mole (5.46 g.) of zinc sulfate heptahydrate and 0.001 mole (0.17 g.) of manganese sulfate dihydrate. Agitation of the solution was continued for one-half hour, following which the solid product which precipitated out was filtered off, washed with water and dried at 40° C. The zinc(95)manganese dihydrate(5)ethylenebisdithiocarbamate:diethylenetriamine(4.2:1) product which was recovered was a light purple solid, substantially insoluble in water or organic solvents. The product decomposed at 156° C. Elemental analysis of the product was consistent with the assigned structure. C, H, N; found (percent): 19.8, 3.3, 12.9; calculated (percent): 19.84, 3.1, 12.7.

Example 21

To an agitated solution of 0.02 mole (5.15 g.) of 93% nabam dissolved in 100 ml. of distilled water was added 0.0033 mole (0.34 g.) of diethylenetriamine. To this agitated solution was added dropwise 10 ml. of an aqueous solution containing 0.019 mole (5.46 g.) of zinc sulfate heptahydrate and 0.001 mole (0.17 g.) of manganese sulfate dihydrate. Agitation of the solution was continued for one-half hour, following which the solid product which precipitated out was filtered off, washed with water and dried at 40° C. The zinc(95)manganese dihydrate(5)ethylenebisdithiocarbamate:diethylenetriamine(6.3:1) product which was recovered was a white solid, substantially insoluble in water or organic solvents. The product decomposed at 159° C. Elemental analysis of the product was consistent with the assigned structure. C, H, N; found (percent): 19.3, 3.1, 12.1; calculated (percent): 19.1, 2.9, 11.9.

Example 22

To an agitated solution of 0.02 mole (7.28 g.) of disodium ethylenebisdithiocarbamic acid hexahydrate dissolved in 75 ml. of distilled water was added 0.01 mole (1.03 g.) of diethylenetriamine. To this agitated solution was added dropwise 6 ml. of an aqueous solution containing 0.02 mole (2.73 g.) of zinc chloride. Agitation of the solution was continued for one-half hour, following which the solid product which precipitated out was filtered off, washed with water and dried at 40° C. The zinc ethylenebisdithiocarbamate:diethylenetriamine-(2:1) product which was recovered with a white solid, substantially insoluble in water or organic solvents. The product decomposed at 142° C. Elemental analysis of the product was consistent with the assigned structure. C, H, N; found (percent): 22.4, 3.6, 15.1; calculated (percent): 22.05, 3.83, 15.0.

Example 23

To an agitated solution of 0.02 mole (7.28 g.) of disodium ethylenebisdithiocarbamic acid hexahydrate dissolved in 75 ml. of distilled water was added 0.0066 mole (0.68 g.) of diethylenetriamine. To this agitated solution was added dopwise 6 ml. of an aqueous solution containing 0.02 mole (2.73 g.) of zinc chloride. Agitation of the solution was continued for one-half hour, following which the solid product which precipitated out was filtered off, washed with water and dried at 40° C. The zinc ethylenebisdithiocarbamate:diethylenetriamine-(3:1) product which was recovered was a white solid, substantially insoluble in water or organic solvents. The product decomposed at 150° C. Elemental analysis of the product was consistent with the assigned structure. C, H, N; found (percent): 21.7, 3.5, 13.3; calculated (percent): 20.66, 3.34, 13.56.

Example 24

To an agitated solution of 0.02 mole (7.28 g.) of disodium ethylenebisdithiocarbamic acid hexahydrate dissolved in 75 ml. of distilled water was added 0.005 mole (0.52 g.) of diethylenetriamine. To this agitated solution was added dopwise 6 ml. of an aqueous solution containing 0.02 mole (2.73 g.) of zinc chloride. Agitation of the solution was continued for one-half hour, following which the solid product which precipitated out was filtered off, washed with water and dried at 40° C. The zinc ethylenebisdithiocarbamate:diethylenetriamine-(4:1) product which was recovered was a white solid, substantially insoluble in water or organic solvents. The product decomposed at 158° C. Elemental analysis of the product was consistent with the assigned structure. C, H, N; found (percent): 19.5, 3.3, 12.5; calculated (percent): 19.95, 3.08, 12.8.

Example 25

To an agitated solution of 0.02 mole (7.28 g.) of disodium ethylenebisdithiocarbamic acid hexahydrate dissolved in 75 ml. of distilled water was added 0.0033 mole (0.34 g.) of diethylenetriamine. To this agitated solution was added dopwise 6 ml. of an aqueous solution containing 0.02 mole (2.73 g.) of zinc chloride. Agitation of the solution was continued for one-half hour, following which the solid product which precipitated out was filtered off, washed with water and dried at 40° C. The zinc ethylenebisdithiocarbamate:diethylenetriamine-(6:1) product which was recovered was a white solid, substantially insoluble in water or organic solvents. The product decomposed at 160° C. Elemental analysis of the product was consistent with the assigned structure. C, H, N; found (percent): 19.0, 2.8, 11.8; calculated (percent): 19.14, 2.8, 11.96.

The complex compounds of the invention can be used to alter the growth of plants including both fungal plants and the higher plants. When the complex compounds are employed to control fungus attack, the complex compounds are employed by contacting fungi and their habitats with a plant growth-altering amount which is also an antifungal amount of one or more of the complex compounds, the term "habitat" here being used in its broadest sense to include higher plants and plant parts thereof, growth media and any other spaces, areas or surfaces with which fungi may come into contact. The term "higher plant" includes the chlorophyllous plants having leaves, stems, roots and the like such as the angiospermae and gymnospermae. When the complex compounds are employed as plant growth stimulents; they are employed by contacting portions of higher plants including plant parts such as the leaves, stems, seeds, flowers or fruits thereof with a plant growth-latering amount which is also a growth-stimulating amount of one or more of the compounds. In general, when the compounds are employed to control fungal attack on higher plants or plant parts, an antifungal amount is also a growth-stimulating amount to the higher plant, so that contacting higher plants with an antifungal amount of a complex compound also provides stimulation and improvement of the growth of the higher plant.

In such operations. the complex compounds are advantageously employed to control fungal attack or stimulate growth or both on such representative higher plants as almond, apple, apricot, banana, cherry, peach, pear, grape, carrot, tomato, cabbage, cucumber, cantaloupe, spinach, potato, beet, corn, hops, rice, wheat, beans, cotton, lettuce, onions, celery, tobacco and other crop plants as well as ornamental shrubs and flowering plants and turf grasses. In such operations, the higher plant or plant part is contacted with a plant growth-altering amount of a complex compound of the invention. Such plant growth-altering amount is at least an antifungal amount or a growth-stimulating amount, depending on the effects or combination of effects to be produced. It is essential that such antifungal or growth-stimulating amount be less than a phytotoxic amount, that is, the amount of complex compound which deleteriously affects the growth of the higher plant by injuring the higher plant or plants parts, substantially inhibiting the growth, flowering or reproduction thereof or the like. For example, when applied to growing plants, application rates in excess of about 25 pounds of complex compound per acre is generally unnecessary to obtain good antifungal and growth-stimulating results, and can produce phytotoxic responses and inhibition of the growth of many higher plants. Excellent control of fungi and stimulation of the growth of higher plants is observed when the complex compounds are applied to the above-ground portions of higher plants in amounts from about 0.004 to about 3 pounds of complex compound per acre or when aerial portions of higher plants are contacted with compositions containing from about 25 to about 2400 or more parts by weight of complex compound per million parts by weight of total composition. Similarly, application of complex compounds to seeds of higher plants in amounts of from about 0.5 ounce to about 16 ounces of complex compound per 100 pounds of seed provides excellent control of fungi without inhibiting germination of the seed and growth of plants therefrom.

When it is desired to control fungi and effects on higher plants can be disregarded (as when wood, storage bins, paper, cloth and the like are to be treated), or when fungal control is to be obtained in fungal growth media other than the aerial portions of higher plants such as in the treatment of soil or orchard floors, the complex compounds are employed in a plant growth-altering amount which is an antifungal amount. In such operations, the compositions are applied at rates of from 0.004 to about 3, to about 100 pounds per acre, or in amounts sufficient to provide the complex compound in the fungal habitat in concentrations of at least 1 part by weight of complex compound per million parts by weight of fungal habitat or substrate. For application to soil, it is usually unnecessary to apply more than about 100 pounds of complex compound per acre of soil, and in most cases, excellent antifungal results can be obtained at application rates of from about 0.004 to about 50 pounds per acre. In other operations, the complex compounds are applied to fungi or their growth media or habitats, wrapping papers, storage bins and the like as compositions containing at least about one part or more by weight of complex compound per million parts by weight of growth media or habitat such as soil, wood, paper or the like.

The complex compounds can be employed in their unmodified form or they can be employed in compositions comprising additaments and adjuvants, preferably a non-phytotoxic adjuvant. Conventiently, the additaments can be added directly to the unmodified reaction mixture and the reaction mixture plus additaments employed directly as antifungal and plant growth regulatory compositions. The term "non-phytotoxic adjuvant" refers to conventional fungicide adjuvants which are not substantially deleterious to plant leaves, stems, flowers, fruit and the like and not substantially inhibitory to the growth of plants at rates of application of complex compounds consistent with good plant growth-altering activity. Such compositions can contain from about 0.0001 or less to about 2 percent or more by weight of a complex compound. Liquid compositions can include one or more fungicide adjuvant such as aqueous alcohols, acetone, toluene, petroleum distillates, dimethylsulfoxide and the like. Dust compositions can be formulated by employing finely divided solid adjuvants such as powdered walnut shells, pyrophyllite, chalk, talc, gypsum or the like and can include solid surface active dispersing agents such as fuller's earth, bentonite, montmorillonite, kieselguhr, attapulgite clay and the like. The compositions can also be prepared as concentrate compositions containing from about 2 to about 98 percent of a complex compound. Such compositions are adapted to be diluted by admixtuer with additional adjuvants prior to use.

The complex compounds can also be incorporated with other active agents to provide combinations of effects or synergistic results in particular operations. For example, the compositions can include additional fungicides or preservatives such as the phenolic preservatives, halogenated salicylanilides, sulfur, copper fungicides and the like; insecticides, nematocides, fumingants and other pesticides such as dichlorodiphenyltrichloroethane, hexachlorocyclohexane, malathion, karathane, diethyl-p-nitrophenylmonothiophosphate, methyl bromide, ethylene dibromide, O,O - diethyl 0 - (3,5,6-trichloro-2-pyridyl)-carbamate and the like; fertilizers including ammonium, phosphate and urea fertilizers and trace mineral plant nutrients; and pre-emergent or post-emergent herbicides such as the halogenated phenoxy ailphatic acids, dinitro-secondary-butylphenol, 3-(3,4-dichlorophenyl)-1,1-dimethylurea and the like. When the complex compounds are employed to treat higher plants, any other active agents are selected to provide a composition which will provide the desired additional effects such as control of insects, slugs, nematodes and weeds without adversely affecting the plant species treated.

The compositions can also be formulated as wettable powders including ionic or nion-ionic surface active dispersing agents. A preferred group of compositions includes those comprising a complex compound and a surface active dispersing agent. The term "surface active dispersing agent" is employed herein to include all agents which are capable of acting as the interfacial surface between the complex compounds and water or an organic liquid as the dispersion medium, facilitating thereby the dispersion of the complex compound in water or organic liquid to form dispersible concentrate compositions or the like. Representative surface active dispersing agents include bentonite, montmorillonite, fuller's earth, attapulgite and other clays, condensation products of alkylene oxides with phenols and organic acids, alkyl aryl sulfonates, fatty acid esters of sugars and ethylene oxide derivatives thereof, polyoxyethylene derivatives of sorbitan esters, complex alcohols, mahogany soaps and the like. Particularly good results can be obtained by the use of lignin sulfonates such as the calcium, magnesium, sodium or potassium salts, or by the use of goulac which is a mixture of magnesium lignin sulfonate, calcium lignin sulfonate and pentose sugars; these lignin additives can be employed alone or along with non-phytotoxic polyvalent metal ion-containing compounds (e.g. sulfates, sulfites or chlorides of iron or zinc) as well as with other wetting and dispersing agents and with dispersion stabilizers, as recited below. Other suitable surface active dispersing agents can be found in "Detergents and Emulsifiers, Up to Date" written and published by John W. McCutcheon, Inc., Morristown, N. J., 1967.

The preferred compositions comprising a complex compound and a surface active dispersing agent can be treating compositions containing from about 0.0001 or less to about 2 or more percent by weight of the complex compound, or they can be concentrate compositions containing from about 2 to about 98 percent by weight of the complex compound. These concentrate compositions, which may contain from about 0.01 or less to about 20 or more percent of the dispersing agent, can be diluted by the addition of water, organic solvents, additaments, non-phytotoxic adjuvants and the like to prepare the ultimate treating compositions.

Another preferred group of compositions includes those comprising a complex compound and a dispersion stabilizer. The term "dispersion stabilizer" is employed herein to include those agents which act to promote the dispersion of the complex compounds in aqueous or organic liquid systems and to inhibit the settling of solids therefrom, and which generally act to increase the viscosity of the liquid dispersion medium. Such dispersion stabilizers also contribute to the holding of the active complex compounds on plant parts or the like when the compositions are employed as sprays. Representative dispersion stabilizers which can be employed include alginic acid, blood albumin, carboxymethyl cellulose, paraformaldehyde, casein, gluten, starch, linear and/or cross-linked polyacrylamides, natural and artificial gums such as gum arabic, guar gum, hydroxypropylmethyl cellulose and hydroxypropyl cellulose, pectins, gelatin and the like and compatible mixtures thereof. Compositions comprising a complex compound and from about 0.25 to about 20 to about 95 percent of a dispersion stabilizer provide excellent plant growth-altering results in liquid dispersions. Such compositions provide deposits of increased amounts of complex compounds on plant parts when applied as sprays at given application rates. Spray compositions containing a complex compound and from about 0.25 to about 20 percent by weight of a dispersion stabilizer selected from the lower alkyl and hydroxy lower alkyl cellulose ethers wherein lower alkyl is methyl, ethyl or propyl are particularly preferred, and hydroxypropylmethyl cellulose is a dispersion stabilizer of choice.

The complex compounds and compositions containing the same can be applied to plants, fungi or growth media by conventional procedures including spraying, dipping, dusting, rolling onto plant seeds, application to soil with or without subsequent incorporation by disking or the like, impregnation, dispersion in irrigation water or the like. The compositions can be applied at rates varying from a few pounds or gallons to several hundred pounds or gallons per acre, depending upon such factors as the concentration of complex compound and the effect to be produced, so long as plants, plant parts or their habitats are contacted wtih a growth-altering amount of a complex compound.

Example 26

In a representative operation, excellent control of the downy mildew organism, *Plasmorphara viticola*, is obtained when the above-ground portions of grape plants are treated with aqueous spray compositions containing one of zinc ethylenebisdithiocarbamate:triethylenetetramine (1:1);
zinc ethylenebisdisthiocarbamate:tetraethylenepentamine (1:1);
zinc ethylenebisdithiocarbamate:pentaethylenehexamine (2:1);
zinc ethylenebisdithiocarbamate:tetraethylenepentamine (5:1);
zinc ethylenebisdithiocarbamate:pentaethylenehexamine (3:1);
zinc(95)manganese dihydrate(5)ethylenebisdithiocarcarbamate:triethylenetetramine(1.23:1);
zinc(70)manganese dihydrate(30)ethylenebisdisthiocarbamate:triethylenetetramine(1.33:1);
zinc(30)manganese dihydrate(70)ethylenebisdithiocarbamate:triethylenetetramine(1.25:1);
zinc(95)iron(5)ethylenebisdithiocarbamate:triethylenetetramine(1.36:1);
zinc(60)-copper(40)ethylenebisdithiocarbamate:triethylenetetramine(1.2:1);
zinc(90)iron III(5)manganese dihydrate(5)ethylenebisdithiocarbamate:triethylenetetramine(1.33:1);
zinc(90)-cobalt(10)ethylenebisdithiocarbamate:triethylenetetramine-(1.66:1);

as the sole active agent therein at a concentration of 150 parts by weight of the active compound per million parts by weight of composition, and of zinc ethylenebisdithiocarbamate:triethylenetetramine (2:3);
zinc ethylenebisdithiocarbamate:triethylenetetramine (4:1);
zinc(80)nickel(20)ethylenebisdithiocarbamate:triethylenetetramine(1:1);
zinc 1,2-propylenebisdithiocarbamate:triethylenetetramine(1.33:1);
zinc ethylenebisdithiocarbamate:triethylenetetramine (8:1)

at a concentration of 600 parts per million. Thereafter the treated plants (along with untreated checks) are inoculated with viable spores of *Plasmophara viticola*. All the plants are held for four days under conditions of temperature and humidity conducive to the growth of the fungal organism. Observations of the plants treated with a complex compound of the present invention showed excellent control of fungal attack and prevention of downy mildew infestation, the treated plants being healthy and growing vigorously, while the untreated check plants showed heavy fungal infestation with attendant injury to the plant.

Example 27

In an additional operation, excellent control of the downy mildew organism, *Plasmopara viticola*, is obtained when the above-ground portions of grape plants were treated with aqueous spray compositions containing one of zinc(95)manganese dihydrate(5)ethylenebisdithiocarbamate:ethylenediamine(6.3:1);
zinc(95)manganese dihydrate(5)ethylenebisdithiocarbamate:ethylenediamine(4.2:1);
zinc(95)manganese dihydrate(5)ethylenebisdithiocarbamate:diethylenetriamine(4.2:1);
zinc(95)manganese dihydrate(5)ethylenebisdithiocarbamate:diethylenetriamine(6.3:1);
zinc ethylenebisdithiocarbamate:diethylenetriamine-(2:1);
zinc ethylenebisdithiocarbamate:diethylenetriamine-(3:1);
zinc ethylenebisdithiocarbamate:diethylenetriamine-(4:1); and
zinc ethylenebisdithiocarbamate:diethylenetriamine-(6:1), at a concentration of 600 parts by weight per million parts of the ultimate composition. Thereafter the plants along with untreated check plants were inoculated with viable spores of *Plasmopara viticola*. All of the plants were held for four days under conditions of temperature and humidity conducive to the growth of the fungal organism. Observation of the plants treated with a complex compound of the present invention showed excellent control of fungal attack and prevention of downy mildew infestation, the treated plants being healthy growing vigorously, while the untreated check plants showed heavy fungal infestation with attendant injury to the plants.

Example 28

In similar representative operations, excellent controls of *Phytophthora infestans* were obtained when the above-ground portions of tomato plants were treated with aqueous spray compositions containing one of zinc ethylenebisdithiocarbamate:triethylenetetramine(1:1); zinc ethylenebisdithiocarbamate:triethylenetetramine(4:1) and zinc (95)manganese dihydrate(5)ethylenebisdithiocarbamate: triethylenetetramine(1.23:1) as the sole active ingredient therein at a concentration of 37 parts per million, and the plants were thereafter inoculated with a suspension of viable spores of *Phytophthora infestans* (late blight). In contrast to the untreated check plants, the treated plants were observed to be in a state of vigorous healthy growth throughout the test period.

Example 29

In other representative operations, an aqueous suspension containing 600 parts per million of zinc(95)manganese dihydarte(5)ethylenebisdithiocarbamate:triethylenetetramine(1.23:1) was applied to portions of the leaves of young bean plants. The suspensions were applied in uniform droplets of 50 microliters each and allowed to dry overnight. The bean plants were then inoculated over the entire leaf surface with viable spores of bean rust (*Uromyces phaseoli*) and held for one week under conditions conducive to the growth of bean rust. Similar untreated plants were similarly inoculated and held to serve as checks. At the end of the test period, the check plants showed widespread eruption of bean rust pustules over the entire inoculated leaf surface. Observations of the treated plants showed pustule-free zones of leaf surface surrounding each portion treated with a complex compound and extending about 3.75 centimeters beyond such treated portions. Such results indicate redistribution and translocation of the complex compound through the plant structure without significant loss of antifungal activity.

Example 30

In other representative operations, mature healthy grape plants of the Garignane variety were sprayed three times through the grape blooming period at approximately one week intervals with an aqueous suspension containing one pound of zinc ethylenebisdithiocarbamate:triethylenetetramine(1:1) per 100 gallons, the spray being applied at a plant growth-altering amount of approximately 100 gallons per acre. Similar grape plants were left untreated to serve as checks.

No injury to any of the plants was detected and at the end of the growing season, the yield and quality of the fruit is determined. The check plants were found to produce about 12.2 pounds of grapes per vine, about 22.5 percent of such grapes being #1 market grade. The plants treated with zinc ethylenebisdithiocarbamate:triethylenetramine(1:1) were found to produce about 16.9 pounds of grapes per vine, with about 47 percent of such grapes being #1 grade.

PREPARATION OF STARTING MATERIALS

The polyethylenepolyamine starting materials employed to prepare the complex compounds of the invention are commercially available chemicals which can be prepared in conventional procedures by the reaction of ethylene dichloride with ammonia under suitable conditions of temperature and pressure in the presence of sodium hydroxide. The formation of said polyethylenepolyamines is found by limiting the amount of ammonia added and by recycling the unreacted ethylenediamine and diethylenetriamine which is found during the reaction. The desired products are recovered by distillation.

The polymetallic zinc-containing alkylenebisdithiocarbamate starting materials are members of a known class of polymeric compounds which can be described as "co-reacted alkylenebisdithiocarbamates" in accordance with Nemec et al., U.S. Pat. No. 3,210,394. They can be prepared in methods analogous to those of Nemec et al. by the methathetic reaction of a water-soluble alkylenebisdithiocarbamate salt such as an alkali metal or ammonium salt with a mixture of water-soluble salts of zinc and the additional metal or metals such as the chlorides, sulfates, acetates or the like. The zinc and additional metal salts are employed in the molar ratio which is desired in the polymetallic product. The reaction is conveniently carried out in water as a reaction medium. The product precipitates from the reaction mixture and can be purified by conventional techniques such as washing.

The polymetallic zinc-containing alkylenebisdithiocarbamate materials can be characterized and distinguished from mixtures of metallic salts by their physical properties in procedures such as those described by Nemec et al. and including elemental analysis, X-ray diffraction and spectroscopic analysis.

The polymetallic zinc-containing alkylenebisdithiocarbamate starting materials can also be prepared by the reaction of ethylenediamine or 1,2-propylenediamine, carbon disulfide, caustic soda or ammonium hydroxide and a mixture of soluble salts of zinc and the additional metal or metals. Such procedure is analogous to that employed for the preparation of zinc alkylenebisdithiocarbamates.

I claim:
1. A metallic zinc-containing alkylenebisdithiocarbamate:ethylenepolyamine complex compound wherein the metal is from 30 to 100 mole percent zinc and from 70 to zero mole percent of additional metal consisting of one or more of manganese, nickel, iron, cobalt or copper; the ethylenepolyamine corresponds to one or more compounds of the formula

$$NH_2-(CH_2CH_2NH)_n-H$$

in which $n$ represents an integer from one to five, inclusive; and the molar ratio of zinc to the ethylenepolyamine is from about 8:1 to 3:1, inclusive.

2. The compound of claim 1 wherein the additional metal, when present, is manganese, iron or mixtures thereof.

3. The compound of claim 1 wherein the ethylenepolyamine is triethylenetetramine.

4. The compound of claim 1 wherein the compound is a zinc-containing ethylenebisdithiocarbamate:ethylenepolyamine complex compound.

5. The compound of claim 4 wherein the additional metal, when present, is manganese, iron or mixtures thereof, the molar ratio of zinc to ethylenepolyamine is from about 4:1 to about 3:1, inclusive, and the metal is from about 70 to 100 mole percent zinc and from about 30 to 0 mole percent of manganese, iron or mixtures thereof.

6. The compound of claim 5 wherein the ethylenepolyamine is one or more of the compounds triethylenetetramine, tetraethylenepentamine and pentaethylenehexamine.

7. The compound of claim 4 wherein the additional metal, when present, is manganese, iron or mixtures thereof, the molar ratio of zinc to ethylenepolyamine is from about 6:1 to about 3:1 and the metal is from about 90 to about 100 mole percent zinc and from about 10 to 0 mole percent of said manganese, iron or mixtures thereof.

8. The compound of claim 7 wherein the ethylenepolyamine is one or more of the compounds ethylenediamine, diethylenetriamine or triethylenetetramine.

References Cited
UNITED STATES PATENTS

| | | | |
|---|---|---|---|
| 3,536,742 | 10/1970 | Noversoske | 260—429.9 X |
| 2,885,416 | 5/1959 | Costabello | 424—289 |
| 2,321,301 | 6/1943 | Lichty | 260—429.9 |
| 3,288,627 | 11/1966 | Bialczak | 260—429.9 X |
| 3,082,229 | 3/1963 | Nash | 260—429.9 X |
| 3,210,394 | 10/1965 | Nemec et al. | 260—429.9 X |
| 3,259,643 | 7/1966 | Nash | 260—429.9 X |

HELEN M. S. SNEED, Primary Examiner

U.S. Cl. X.R.
71—97; 424—289

PO-1050
(5/69)

UNITED STATES PATENT OFFICE
CERTIFICATE OF CORRECTION

Patent No. 3,755,394          Dated August 28, 1973

Inventor(s) Robert L. Noveroske

It is certified that error appears in the above-identified patent and that said Letters Patent are hereby corrected as shown below:

Column 2, line 4, delete "polyethylenepolymaines" and substituted --polyethylenepolyamines--.

line 17, delete "the".

line 22, insert after carbamate --obtained by the reaction of an alkylenebisdithiocarbamate--.

line 54, strike "diethylenetetramine" and substitute --diethylenetriamine--.

line 58, delete "2.5" and substitute --2--.

Column 9, line 58, delete "terta-" and substitute --tetra- --.

line 68, delete "ehtylenebisdithiocarbamate." and substitute --ethylenebisdithiocarbamate.--.

Column 11, line 12, delete "with" and substitute --which--.

Column 12, line 72, delete "5.15" and substitute --5.5--.

Column 13, line 26, delete "with" and substitute --was--.

Column 14, line 28, delete "latering" and substitute --altering--.

Column 15, line 51, delete "admixtuer" and substitute --admixture--.

line 67, delete "ailphatic" and substitute --aliphatic--.

line 75, delete "nion-ionic" and substitute --non-ionic--.

Column 17, line 7, delete "wtih" and substitute --with--.

UNITED STATES PATENT OFFICE
CERTIFICATE OF CORRECTION

Patent No. 3,755,394         Dated   August 28, 1973

Inventor(s)  Robert L. Noveroske

It is certified that error appears in the above-identified patent and that said Letters Patent are hereby corrected as shown below:

Column 17, line 11, delete "Plasmorphara" and substitute --Plasmorpara--.

line 17, delete "ethylenebisdisthiocarbamate" and substitute --ethylenebisdithiocarbamate--.

line 27, delete "ethylenebisdisthiocar-" and substitute --ethylenebisdithiocarline 57, delete "Plasmophara" and substitute --Plasmopara--.

Column 18, line 47, delete "dihydarte" and substitute --dihydrate--.

Column 19, line 7, delete "tramine" and substitute --tetramine--.

Signed and sealed this 26th day of February 1974.

(SEAL)
Attest:

EDWARD M. FLETCHER, JR.
Attesting Officer

C. MARSHALL DANN
Commissioner of Patents